April 18, 1939.   H. C. KREMERS   2,155,315

APPARATUS FOR MAKING AQUEOUS HYDROFLUORIC ACID

Filed March 7, 1938

H. C. Kremers INVENTOR.

BY William I. Brown

ATTORNEY.

Patented Apr. 18, 1939

2,155,315

UNITED STATES PATENT OFFICE 2,155,315

APPARATUS FOR MAKING AQUEOUS HYDROFLUORIC ACID

Harry C. Kremers, Cleveland Heights, Ohio, assignor to The Harshaw Chemical Company, Elyria, Ohio, a corporation of Ohio Application March 7, 1938, Serial No. 194,237

3 Claims. (Cl. 23—272.1)

This invention relates to apparatus for producing aqueous hydrofluoric acid from water and anhydrous hydrofluoric acid as a continuous process.

It is less expensive to ship hydrofluoric acid in anhydrous condition in suitable containers under pressure than to ship the aqueous acid in carboys or drums. In order, however, to secure this advantage in reduced transportation cost where the material finally has to be in aqueous condition, it is necessary to provide for producing aqueous acid in a convenient manner from the anhydrous compound.

Accordingly, it is the principal object of the invention to provide for connection of a receptacle containing anhydrous hydrofluoric acid with permanent installation of mixing equipment whereby the simple opening of valves to a desirable degree makes it possible to obtain instantly and continuously for as long as desired, within the capacity of the receptacle, a discharge of aqueous hydrofluoric acid of desired strength.

Figure 1:
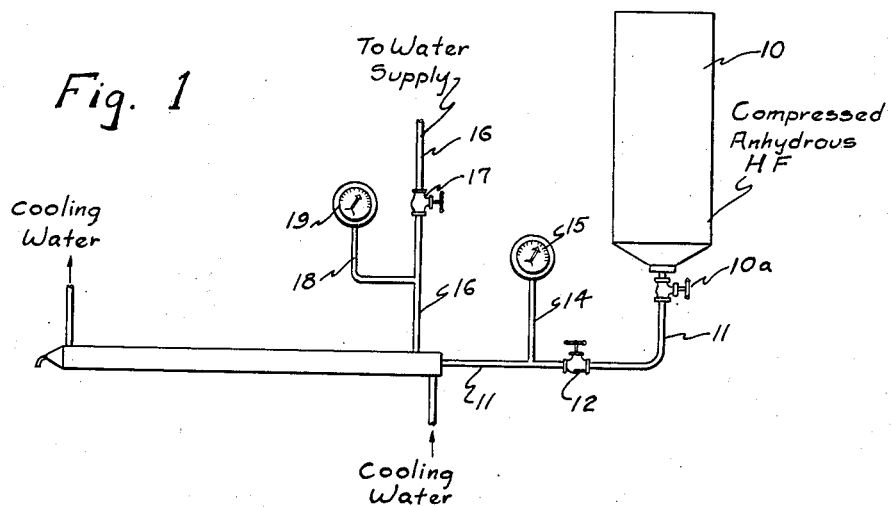
Figure 2:
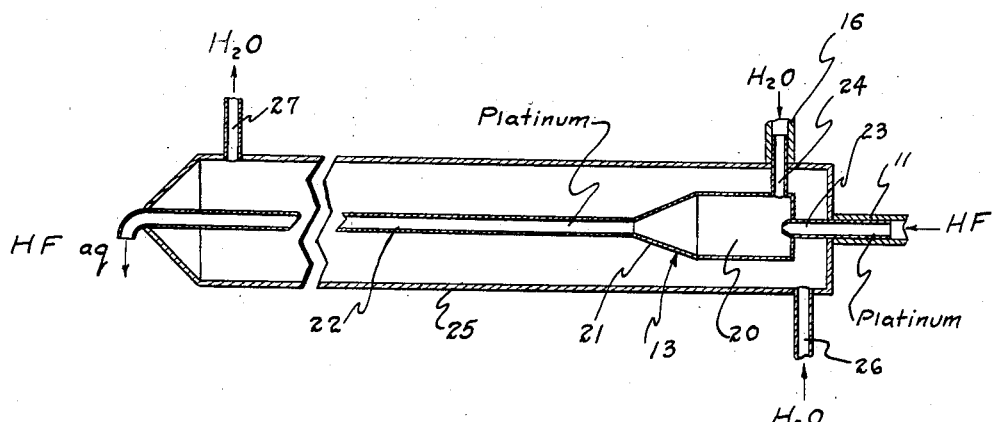

Other and more limited objects will be in part apparent and in part pointed out hereinafter in connection with the accompanying drawing, wherein Fig. 1 is a schematic representation of an installation of mixing equipment and Fig. 2 is an enlarged sectional view showing the mixing and cooling tube and the jacket through which the cooling fluid is circulated in contact with the outside of the mixing and cooling tube.

Referring to the drawing, the numeral 10 indicates a receptacle for hydrofluoric acid under pressure. The receptacle is provided with the usual valve mechanism, conventionally illustrated at 10A, and connectors for connection to the supply conduit 11. Connected in communication with the interior of the receptacle is a conduit 11, extending through a valve 12, to the mixing and cooling tube 13. Communicating with the interior of the conduit 11, is a branch conduit 14, carrying a pressure gauge 15. Water is led from any convenient water supply through a conduit 16 and valve 17 to the mixing and cooling tube 13. Communicating with the interior of the conduit is a branch conduit 18 carrying a pressure gauge 19.

The mixing and cooling tube 13 comprises a mixing chamber 20 of relatively large size, which is connected by a tapering portion 21 with a reduced cooling portion 22. In axial alignment with the portion 22 is a nozzle 23, which is connected to the conduit 11, in any suitable manner, and communicates with the mixing chamber 20 through a suitable restriction. Communicating with the mixing chamber 20 on angle to the nozzle 23 is a water inlet 24. The mixing tube 13, including the nozzle 23 and water inlet 24, may be constructed of platinum or magnesium or of some other material lined with platinum or magnesium. Platinum is to be preferred where high purity is desired, but magnesium is satisfactory for production of aqueous acid for many uses. The water inlet 24 is connected in any suitable manner with the conduit 16.

Surrounding the mixing and cooling tube 13 is a jacket 25, through which the nozzle 23 and inlet 24 are sealed, and which is provided with an inlet 26 for cooling fluid and an outlet 27 therefor. The cooling portion 22 is likewise sealed through the jacket 25.

In operation, the receptacle containing hydrofluoric acid in anhydrous condition is connected with the conduit 11 and when it is desired to withdraw aqueous acid, the valves 12 and 17 are opened to an extent to cause a predetermined relative gauge pressure reading corresponding to the strength of aqueous acid desired. The cooling water or other cooling fluid is, of course, being passed through the jacket 25 at the same time. The water entering through the inlet 24 and the anhydrous acid entering through nozzle 23 are completely reacted in the mixing chamber 20, after which, the reaction product is caused to pass through the restricted and elongated cooling portion 22, where the intense heat of reaction is rapidly carried away.

Having thus described the invention, what is claimed is:

1. In combination with means for supplying water under a substantially constant pressure and a container for compressed anhydrous hydrofluoric acid, a mixing and cooling tube having its inner surface at least composed of material resistant to aqueous hydrofluoric acid and comprising a mixing portion having a water inlet and a nozzle for introduction of anhydrous hydrofluoric acid projecting thereinto and a reduced elongated delivery portion adapted to promote rapid cooling, conduit means connecting the water supply means to said water inlet, a valve in said conduit means, a pressure gauge associated with said conduit means between said valve and said water inlet, a second conduit means connecting said container with said nozzle, a valve in said second conduit, a pressure gauge associated with said second conduit between said container and said nozzle and means comprising a jacket enclosing said mixing and cooling tube for circulating a cooling fluid in contact with the exterior thereof to carry away the heat of dilution.

2. In combination with means for supplying water under a substantially constant pressure and a container for compressed anhydrous hydrofluoric acid, a mixing and cooling tube the inner surface of which, at least, is composed of a metal of the group consisting of platinum and magnesium and comprising a mixing portion having a water inlet and a nozzle for introduction of hydrofluoric acid, said nozzle extending in a direction axial to said tube and said water inlet extending substantially at right angles to said nozzle, and a cooling portion continuous with said mixing portion and of an internal cross sectional area not substantially greater than the combined corresponding cross sectional areas of said water inlet and the outlet of said nozzle, a jacket surrounding said mixing tube, inlet and outlet means for circulation of a cooling fluid through said jacket, and conduit means for connecting said container with said nozzle.

3. In combination with means for supplying water under a substantially constant pressure and a container for compressed anhydrous hydrofluoric acid, a mixing and cooling tube having its inner surface at least composed of a metal of the group consisting of platinum and magnesium and comprising a relatively large mixing portion having a water inlet and a nozzle for introduction of anhydrous hydrofluoric acid projecting thereinto and a reduced elongated delivery portion adapted to promote rapid cooling, conduit means connecting the water supply means to said water inlet, a valve in said conduit means, a pressure gauge associated with said conduit means between said valve and said water inlet, a second conduit means connecting said container with said nozzle, a valve in said second conduit, a pressure gauge associated with said second conduit between said container and said nozzle and means for circulating a cooling fluid in contact with the exterior of both said portions of said mixing and cooling tube.

HARRY C. KREMERS.